(12) United States Patent
Di Carlo

(10) Patent No.: US 8,257,086 B1
(45) Date of Patent: Sep. 4, 2012

(54) CHILD'S NAME WRITING EDUCATIONAL PRACTICE AND LEARNING TOOL AND KEEPSAKE

(76) Inventor: Alfonso Di Carlo, Allentown, PA (US)

(*) Notice: Subject to any disclaimer, the term of this patent is extended or adjusted under 35 U.S.C. 154(b) by 893 days.

(21) Appl. No.: 12/270,302

(22) Filed: Nov. 13, 2008

(51) Int. Cl.
*G09B 11/00* (2006.01)
(52) U.S. Cl. ...................................... 434/162
(58) Field of Classification Search .............. 434/156, 434/159, 162, 163, 165, 167, 178, 365
See application file for complete search history.

(56) References Cited

U.S. PATENT DOCUMENTS

| | | | | |
|---|---|---|---|---|
| 4,664,633 A | * | 5/1987 | Garda | 434/164 |
| 4,669,986 A | * | 6/1987 | Yokoyama | 434/164 |
| 5,133,665 A | * | 7/1992 | Engel et al. | 434/167 |
| 5,788,503 A | * | 8/1998 | Shapiro et al. | 434/172 |
| 6,241,528 B1 | * | 6/2001 | Myers | 434/408 |
| 6,869,286 B2 | * | 3/2005 | Furry | 434/167 |
| 7,717,713 B2 | * | 5/2010 | Wescott et al. | 434/162 |
| 7,819,433 B2 | * | 10/2010 | Schulken | 283/45 |
| 2002/0150870 A1 | * | 10/2002 | Fink | 434/162 |
| 2006/0188853 A1 | * | 8/2006 | Mismas, Jr. | 434/162 |
| 2007/0269780 A1 | * | 11/2007 | Miller | 434/162 |
| 2009/0068625 A1 | * | 3/2009 | Petro et al. | 434/160 |

* cited by examiner

*Primary Examiner* — Kurt Fernstrom
(74) *Attorney, Agent, or Firm* — Charles A. Wilkinson; Clinton H. Wilkinson; Adel J. Lomibao

(57) ABSTRACT

An educational tool for teaching children to write their full name with properly formed letters for the first time, including a system for creating a remembrance of such event wherein the actual occurrence of the child's first name writing is saved and converted into a keepsake or remembrance item.

19 Claims, 6 Drawing Sheets

CHILD'S NAME WRITING EDUCATIONAL PRACTICE AND LEARNING TOOL AND KEEPSAKE

BACKGROUND OF THE INVENTION

1. Field of the Invention

The present invention relates to educational tools, systems, and methods for promoting learning of basic skills by young children, and more particularly to an apparatus and method for teaching young children to pronounce and form letters properly, and more particularly still to a learning tool and method for teaching children to write their name for the first time including a system for memorializing such event in the form of a frameable keepsake.

2. Preliminary Discussion

Most children learn to verbalize and correctly pronounce their personal name fairly easily by repeatedly hearing such name spoken by their parents, brothers, sisters, and others in a close relationship with the child, in combination with certain physical queues such as the person when speaking to the child directly facing and addressing the child, as well as various hand and body signals and movements. As the child learns to talk, he or she will naturally mimic and repeat the speech patterns of others, and eventually will come to associate certain words or sounds with his or her name. In contrast, learning to write one's name for the first time is substantially more difficult for the child, and is the result of several learning processes coming together simultaneously. First, the child must learn to properly pronounce his or her name, which as indicated above may or may not have already been learned, and which pronunciation is an important factor in developing good spelling skills. Second, the child must learn to recognize the individual letters and/or characters of the alphabet of the language being learned or spoken, and then to identify and associate certain of these letters with his or her name. Third, the child must develop the coordination and manual dexterity required to use and manipulate a writing utensil such as a pen, marker, stylus or the like to complete the individual letter forming strokes of his or her name. All of such skills must be sufficiently developed in order for the child to be able to write his or her name satisfactorily.

3. Description of Related Art

Numerous educational and learning aids, systems, and devices for teaching basic reading and writing skills to children such as saying, spelling, and writing letters and numbers are known in the prior art. The most relevant-appearing of such references known to the present inventor are discussed briefly below.

U.S. Pat. No. 3,063,164 issued to M. N. Pellegrino et al. entitled "Educational Device" discloses a device for teaching correct penmanship comprised of a slate having a coated wax base and a translucent impression sheet applied over the base, whereby pressure exerted on the impression sheet causes it to stick to the wax base, leaving an impression on the slate. Letter templates are also provided which are placed on the impression sheet and a stylus is used to practice the letter forming strokes using the templates, which strokes are visible on the slate.

U.S. Pat. No. 3,271,884 issued to R. E. Roberson entitled "Means of Teaching a Foreign Language" discloses a workbook for learning foreign words including several templates for practicing writing such words. In one arrangement, each pair of open facing pages includes on the left-hand page at least one picture plus both the English and Spanish spellings of the item depicted in the picture, while on the right-hand page the same picture and English spelling are provided, with a blank line on which the user is instructed to write the Spanish spelling. Roberson is primarily a device for recalling and learning foreign words, but does not include a means for practicing penmanship.

U.S. Pat. No. 4,960,382 issued to A. W. Alford on entitled "Educational Writing Board Kit" discloses a kit containing a colored writing pad having a smooth waxed surface plus a translucent plastic sheet which is placed over the pad. Parallel rows of a hook and loop fastener material are provided on the front surface of the sheet, and one or more grooved numerical or alphabetical letter templates having a matching fastener material on their underside are secured to the sheet. Pressure applied in the grooves of the templates by a stylus causes the color of the surface of the writing pad to be visible through the translucent plastic sheet, so that children can repeatedly practice writing and spelling numbers and letters using the kit. A container for storing the templates is also provided and is foldably attachable to the writing page.

U.S. Pat. No. 5,000,688 issued to E. L. Clamp entitled "Magnetic Stencil Letters" discloses a set of magnetic letters having grooves in the surface of the letters for tracing purposes. The letters are placed on a steel board surface with a piece of paper situated between the board and letters, so that a child can practice writing the letters and form his or her name or other words by tracing.

U.S. Pat. No. 5,102,338 issued to A. G. Kapiloff entitled "Method for Training Children in the Art of Dialogue Writing," discloses a bound book of individual scenes with empty captions, whereby a child or student is made to study the scenes and then practice writing dialogue for the story in the captions. The caption areas are erasable.

U.S. Pat. No. 5,133,665 issued to S. G. Engel et al. entitled "Teaching Book" discloses a book for teaching and practicing writing letters and numbers. While similar in arrangement to the present invention in some respects, one drawback is that after completing all of the exercises there is no place provided for the child to write his or her full or complete name for the first time. In addition, Engel does not provide a system for memorializing such first time writing of his or her name properly as in the present invention.

U.S. Pat. No. 5,409,381 issued to M. L. Sundberg et al. entitled "Educational Display Device and Method" discloses an alphabet letter forming and writing teaching system having different display modes, one of which includes a letter template having arrows showing the proper strokes to be used to form the letter, along with a grooved practice template.

U.S. Pat. No. 6,050,824 issued to G. J Stuart entitled "Representation of Letters of an Alphabet" discloses a letter learning book having separate pages dedicated to learning each letter of the alphabet, which pages are cut in half to form separately turnable top and bottom page sections, with the letter shown in capital letters on the top section and in lowercase letters on the bottom section. The surfaces of the letters have a raised outline and are designed to have a different feel from the page surface and other letters, so that the outline of the letters can be felt and traced by the user's hand.

U.S. Pat. No. 6,142,783 issued to M. A. Rocha on entitled "Handwriting Template System" discloses a set of letter and number templates that are securable in a template holder over a piece of paper. The system also includes a plurality of pages or sheets which are divided into several rows and columns, with the letter to be formed shown in the first column, a stencil for the letter provided in the second column, and several blank spaces in the following columns in which the user can practice writing the letters freehand.

U.S. Pat. No. 6,416,329 issued to K. Hirota et al. entitled "Writing Device for Practice in Writing Characters" discloses a magnetic writing device with a character model attached. Users can thus repeatedly practice writing the characters on the magnetic display.

U.S. Pat. No. 6,966,777 issued to T. Robotham entitled "Tool Device, System and Method for Teaching Reading" discloses a flip-book designed to teach reading skills to young children, in which pictures related to indicia of letters are shown; however, such book is not designed to teach penmanship and writing or serve as a memorializing device in the same manner as the present invention.

U.S. Pat. No. 7,080,983 issued to K. C. Barker entitled "Flipbook for Making Words According to Orthographic Patterns" discloses a flipbook for teaching word structure to students. The word parts are color coded into vowels, prefixes and suffixes, and the like. Such flipbook is designed to teach the more sophisticated concept of word structure rather than teaching children to properly form or write the letters of their name for the first time.

U.S. Pat. No. 7,140,643 issued to M. P. Smith entitled "Apparatus and Method for Teaching Early Learning Skills" discloses a device comprised of a binder having a plurality of removable pages containing various symbols to which matching number or letter symbols can be attached by Velcro. Instruction lines as to the pen strokes needed to form the letters are provided.

U.S. Pat. Pub. No. 2005/0106538 issued to R. G. Freeman at al. entitled "Display Apparatus for Teaching Writing" discloses another device for teaching and practicing letter or word writing using an electronic display device and pen. Such device is in electronic form and users can practice writing letters or words over and over plus reference points to aid in writing are provided.

In addition to teaching children early learning skills such as to read, write, and spell, parents often wish to memorialize certain events in the early lives of their children, such as their birth, or the remembrance of such event for sentimental reasons. For example, U.S. Pat. No. 5,607,337 issued to G. C. Hallahan entitled "Infant Memorabilia System" provides a system for preserving the hand and foot prints of an infant. Wall plaques and the like are also known for recognizing a child's accomplishments, and photographs and videos, of course, can be used to record events as they happen, such as a photograph of a child first crawling, walking, hitting a ball with a bat or the like. However, it is difficult and rare to preserve as a keepsake or remembrance a record of the actual first physical achievement or occurrence of an act or task, since such moments are inherently unpredictable. The present inventor has therefore conceived of a system for memorializing the occurrence of a child writing his or her name properly for the first time by providing a keepsake device as part of the present educational tool or workbook system, wherein after a child has practiced writing and forming the individual letters of his or her name over a period of time, a final separate page or sheet is provided on which the child writes his or her full name for the first time. Such page is removable from the workbook and is suitable for framing or otherwise converting into a keepsake item. In addition, the entire name writing practice book can be retained as part of the family library of keepsakes. In such manner, the actual occurrence of a child's first successful writing of his or her full name is recorded and memorialized so that such event can be referred to as a happy remembrance in future years.

OBJECTS OF THE INVENTION

It is therefore a primary object of the invention to provide an educational tool, system, and method for teaching early learning skills to young children including a tool for teaching such children to properly spell and write their names for the first time, in combination with a system for memorializing such event.

It is a further object of the invention to provide a learning tool that teaches children to properly write their name, wherein children can practice manually forming and writing the letters of their name in a workbook, and then when ready can write their full name properly for the first time on a sheet adapted to be converted into a keepsake device.

It is a further object of the invention to provide an educational tool and method for teaching children to properly and neatly form and write the letters of their name comprising in a preferred embodiment a book having a plurality of ordered pages containing material associated with one of the letters, and preferably including for each letter to be formed a visual display of the letter, graphic images of items having a name containing the letter to be learned that can be pronounced and verbalized by the child to teach the sound of the letter, templates for each of the letters so that the child can practice tracing the letters to learn the proper strokes for forming the letters, a grid area for practicing writing the letters, an area where the child can practice writing his or her full name using a template, and a removable page on which the child can write his or her name for the first time without any aids and which is convertible into a keepsake device.

It is a further object of the invention to provide a learning tool designed to motivate and teach children to spell and write words that can be customized such as to be in the form of a child's book or workbook having a number of ordered internal pages equal to the number of letters of the child's name, and having areas on each internal page where the child can practice writing such letters, and in addition including a separate page on which the child can write their full name for the first time, which page is provided in the form of a removable keepsake or permanent memento of such event.

It is a further object of the invention to provide an educational and learning tool in the form of a book or workbook for small children to practice writing the letters of their name, including visual aids to practice pronouncing each letter, at least one template to practice tracing the letters, and then a sheet for writing their name without assistance for the first time, which sheet is convertible into a keepsake memorializing such event.

It is a further object of the invention to provide a workbook in which children can practice forming the letters of the alphabet that make up their name, the pages of which workbook include examples of each fully formed letter, a grid area for the child to practice forming the letters including tracing the letter to improve penmanship, and further providing visual cues of other words that include the letters being learned.

It is a still further object of the invention to provide an erasable workbook for use by small children to repeatedly practice forming and writing the individual letters of their name, and in addition once the child has learned to write all of the letters properly providing a separate sheet on which the child can write in permanent ink his or her full name for the first time, which sheet includes a removable cover over the writing area and is specifically designed to be converted into a keepsake memorializing such event.

It is a still further object of the invention to provide a memento or keepsake for the parents of a child or for children themselves of the first time a child writes his or her name properly.

Still other objects and advantages of the invention will become clear upon review of the following detailed description in conjunction with the appended drawings.

SUMMARY OF THE INVENTION

The present invention is an educational tool, system and method for teaching basic reading and writing skills to children, and more particularly is a learning aid for teaching young children to spell and write their name neating and correctly, including a system for memorializing the first time a child accomplishes such task. In a preferred embodiment, the educational tool is in a book or workbook form including a cover page, a plurality of ordered inner pages containing material designed to facilitate a child learning to recognize, spell, and write the individual letters of his or her name, and another page for memorializing the child's first successful writing of his or her full name. The cover page preferably includes the child's name printed thereon, as well as other decorative and informational material. The first ordered inner sheet or page contains information related to the first letter of the child's name, and the following successive ordered pages contain information related to the next successive letters of such name. Each ordered sheet preferably includes a visual display of a letter in the child's name, one or more graphic images of items having a name that starts with the same letter, a template or stencil the child can use to practice forming the letters by tracing with a pen or stylus, and a grid area on which the child can practice forming the letter freehand without tracing. The ordered pages preferably have a plastic coating applied so that the practice markings are erasable using a dry erase material. The ordered practice pages also preferably are provided with tabs containing the letter to be practiced are provided for each ordered page, which tabs spell out the child's name when the book is closed and viewed from the front. Also provided is a separate practice page on which the child's full name is spelled out so the child can practice forming his or her full name with proper penmanship by tracing such name. In addition, another page is provided on which the child can write his or her entire name without tracing for the first time. Preferably, such page includes a detachable protective cover that is removed when the child is ready to spell his or her name full name without any assistance for the first time, using a permanent marker or pen. This keepsake page may then be removed from the workbook and is suitable for framing or otherwise converting into a memento. The educational book tool can be translated into any language or culture and is customizable for any name or word.

DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. Reference will now be made in detail to a presently preferred embodiment of the invention as illustrated in the accompanying drawings. Whenever possible, the same reference numbers will be used throughout the drawings to refer to the same or like parts.

Figure 1:
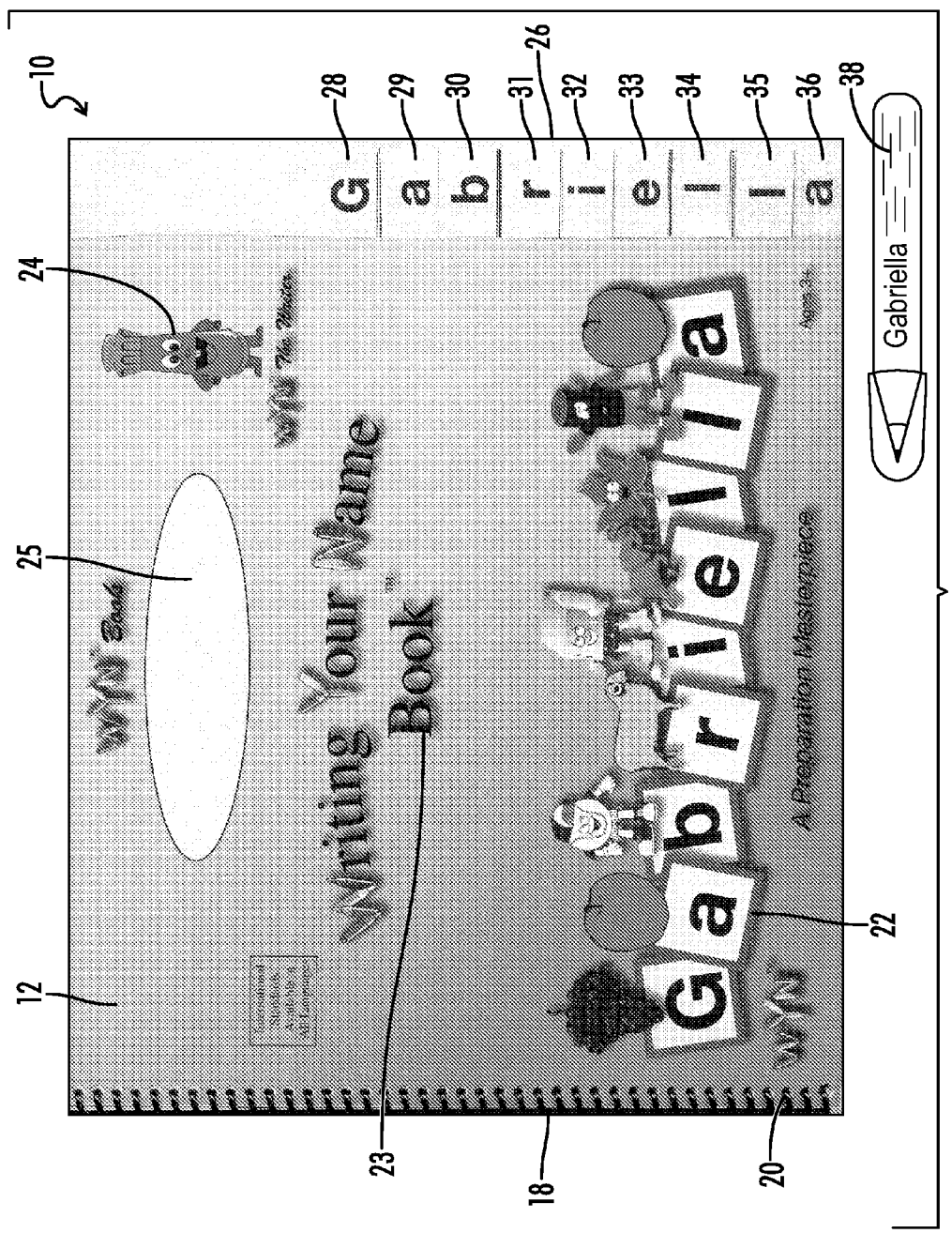
FIG. 1 is a front view of the children's educational learning aid of the present invention with the cover page juxtaposed over the interior sheets or pages.
Figure 2:
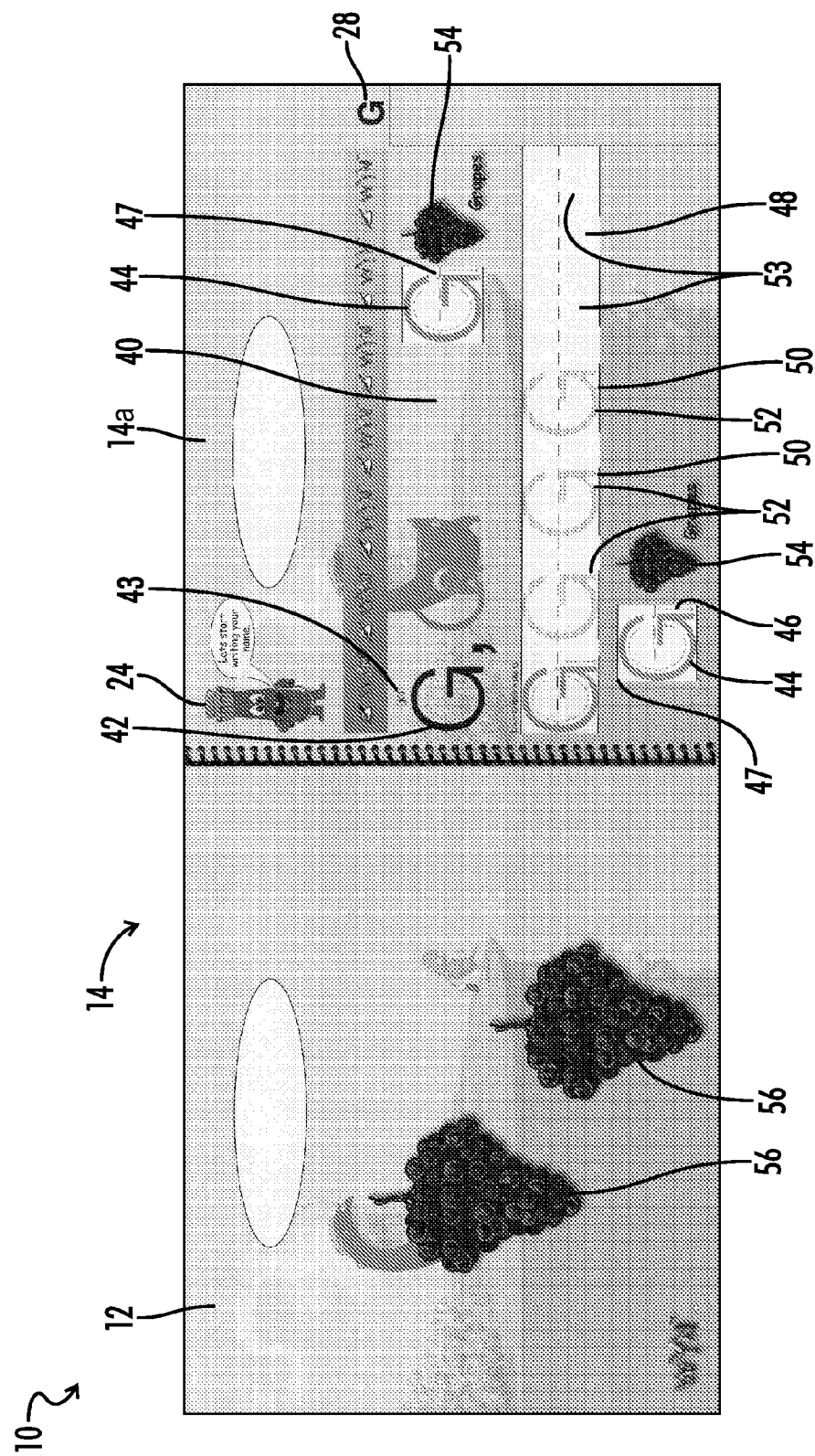
FIG. 2 is a representation of the learning aid of FIG. 1 open to a first ordered inner page.
Figure 3:
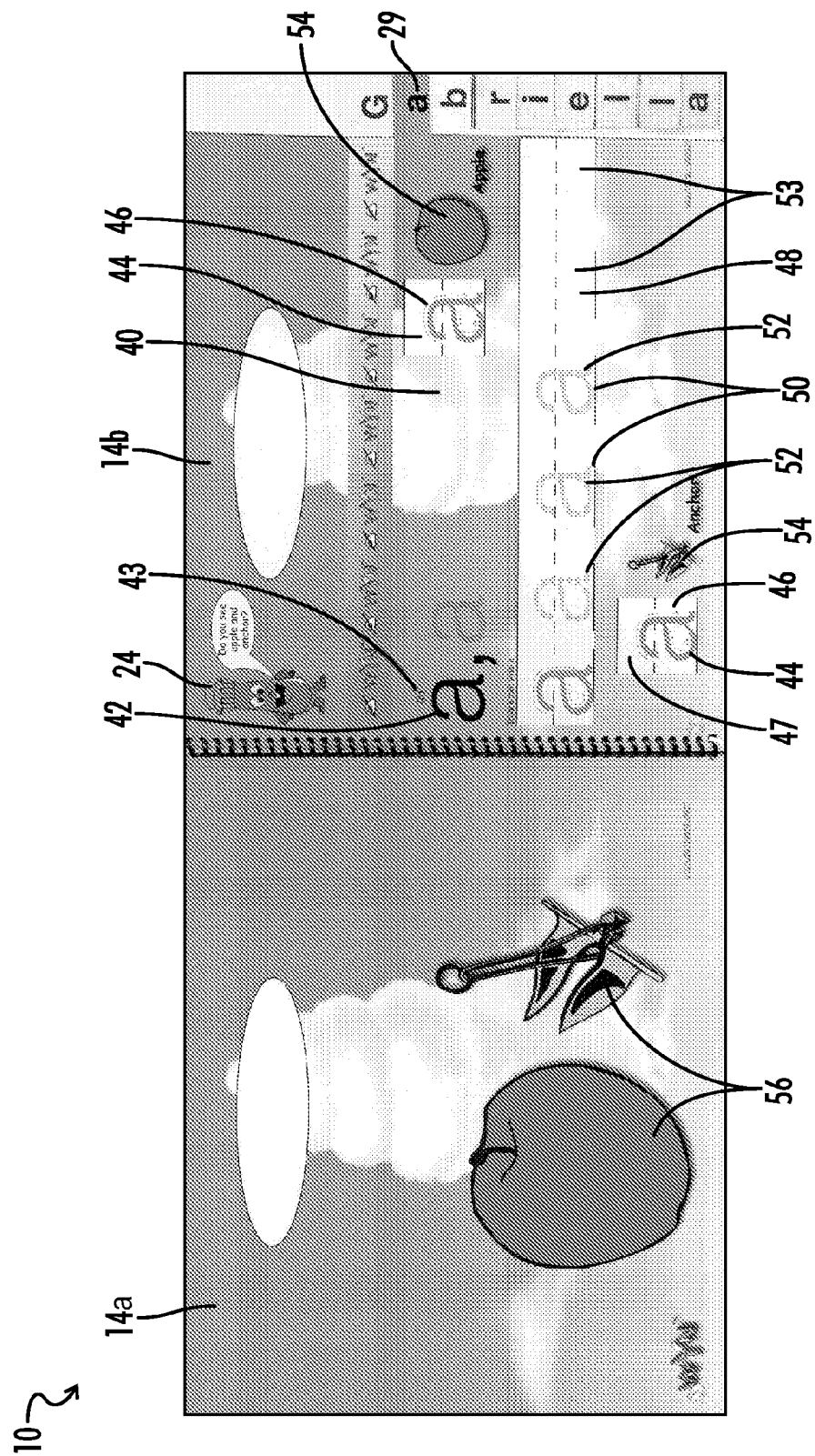
FIG. 3 is a representation of the learning aid of FIGS. 1-2 open to another ordered inner page.
Figure 5:
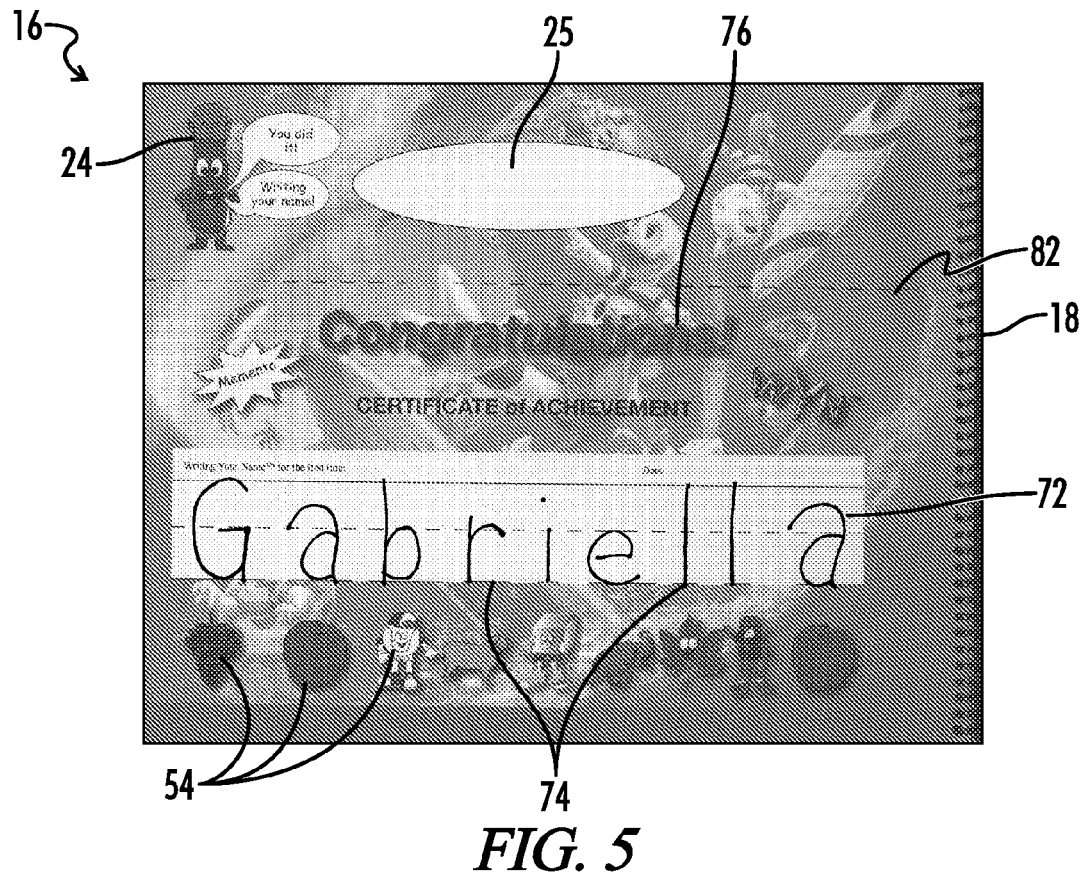
FIG. 5 is representation of the name memorializing page of the present invention.
Figure 6:
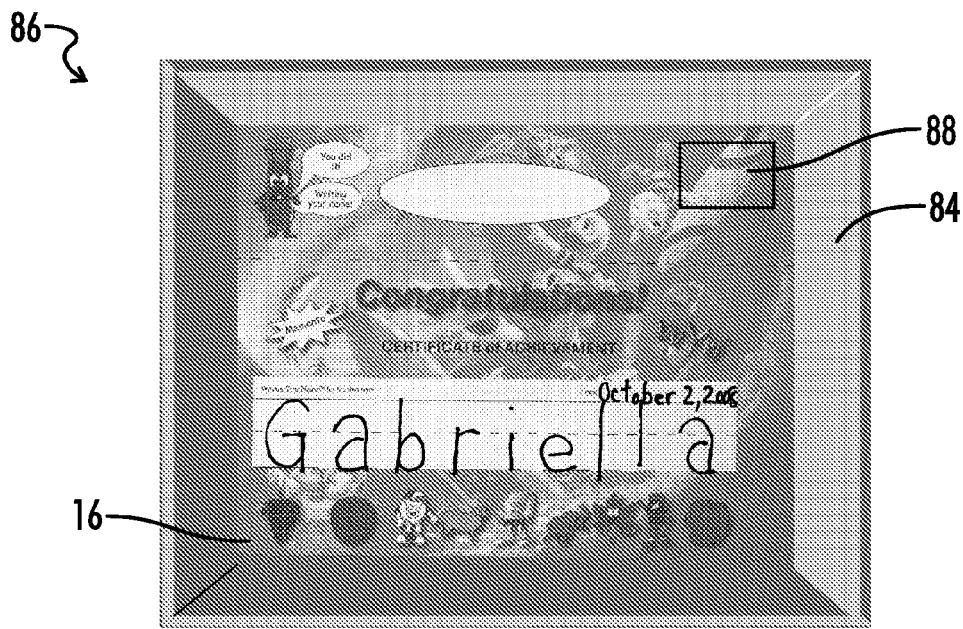
FIG. 6 illustrates the memorializing page as converted into a keepsake device in accordance with the present invention.

Referring now to the FIGS. 1-3, there is shown a learning aid or tool in accordance with the present invention, generally designated by reference numeral 10. Leaning aid or tool 10 is preferably provided in the form of book or workbook for use by young children having a plurality of individual sheets including a cover page 12, one or more ordered inner learning or practice pages 14 (see FIGS. 2-3), a final practice page (see FIG. 4) and a keepsake device 16 which is shown in FIGS. 5-6 and as will be described in greater detail below serves as a memento of the child's first successful spelling of his or her full name without any assistance and with proper penmanship. Cover page 12, ordered practice pages 14, final practice page 15, and keepsake device 16 are bound or joined together along adjacent edge 18, preferably by a spiral binding or a similar binding arrangement type that allows pairs of facing sheets to lay flat in an open configuration, such as shown in FIGS. 2 and 3. Cover page 12 includes name 22, which is the name that learning aid 10 is designed to teach a child to spell and write properly, as well as certain other informative textual, decorative and graphic material, generally designated by reference numeral 23, that is used in identifying, marketing and selling the workbook. One or more narrative characters 24 or the like may also be included with workbook 10, which characters may also appear on the inner pages of workbook 10 to provide general instructions as well as to enhance the overall attractiveness of the workbook to children. A handle 25 for carrying workbook 10 may also be cut along the upper edge of the book. In the presently described embodiment, learning aid 10 is illustrated as being designed to teach a child to spell and write only his or her first name (Gabriella); however, such tool may be modified to include the child's full name, first and last name, nickname, or other word or combinations. Each book will preferably be designed to be sold for a specific name out of a supply or group of separate books for individual names. Traditionally, there have been fewer given (first) names or at least given English names than family (last) names, and in addition since most young children know themselves as well as their friends primarily by their given names, the easiest names to provide for in a supply of books for individual names are given names rather than family names. It is also contemplated, however, that books for special or less common names or those with slightly corrupted or alternative spellings may also be custom ordered via a mail or phone order form, over the Internet, or other suitable means.

Each page of workbook 10 has approximately the same dimensions, and the ordered inner practice sheets 14 preferably include a tab 26 that extends outwardly from the right side edge of page 14, although such tabs could also be formed along the top or bottom edges of the pages. As indicated above, exemplary name 22 on cover sheet 12 in FIG. 1 is "Gabriella", which name is comprised of nine letters. Thus, workbook 10 will preferably contain nine separate ordered inner pages or sheets, referred to herein as indicated as sheets 14a-i, each having a front surface and a back surface. The front surface of each page 14a-11n successive order contains material corresponding to a letter in name 22, with the front surface of page 14a containing material related to the letter "G" (see FIG. 2) in name 22, the front surface of page 14b containing material related to the letter "a" (see FIG. 3) in name 22, the front surface of page 14c containing material related to the letter "b" in name 22, and so on. In addition, the inner surface of cover page 12 preferably serves as the open facing page with respect to first inner page 14a, while the back surface of each successive page 14a-h serves as the open facing page with respect to the next successive letter of name 22 and thus contains information related to such next successive letter. In other words, the front surface of page 14a contains information related to first letter "G" (see FIG. 2), while the back surface of page 14a serves as the open facing page for page 14b and therefore contains material related to the second letter "a" in name 22 (see FIG. 3), the back surface page 14b contains material related to the letter "b", the back surface of page 14c contains material related to the letter "r", and so on. Each successive inner practice page 14a-i also has a separate tab 28, 29, 30, 31, 32, 33, 34, 35, and 36, respectively, with the corresponding letter in name 22 printed thereon. The tabs 28-36 are arranged so that as shown in FIG. 1 all of the letters are visible along the side edge of educational tool 10 from the front and spell out name 22 when cover page 12 is closed and juxtaposed with inner pages 14a-i.

Referring particularly now to FIGS. 2-3, there is shown in FIG. 2 workbook 10 with cover page 12 open and lying flat beside the front surface of inner practice page 14a, while in FIG. 3 workbook 10 is open to page 14b, with the back surface of page 14a lying flat beside the front surface of page 14b. As should be evident from the arrangements shown in FIGS. 2-3, in general in the presently described embodiment the front surfaces of pages 14a-14i serve as the primary work area on which a child can practice tracing and forming the letters corresponding to tabs 28-36 for such pages, while the back surface of cover page 12 and inner pages 14a-h preferably serve as an area for placing graphic representations, text, drawings, and the like related to the letter represented on corresponding page 14a-i. It should also be evident from FIGS. 2-3 as has already been indicated that in use the inner pages of workbook 10 are comprised of pairs of open facing practice pages, formed by the back surface of the preceding page on the left-hand side and the front surface of the following page on the right-hand side. In FIG. 2, practice page 14a for learning to pronounce and write the letter "G" in the name "Gabriella" is shown. The front and rear surfaces of ordered practice pages 14a-14i are preferably coated with a plastic erasable laminate surface of a type known in the prior art, such as a dry erase laminate, in which case learning aid 10 will also preferably be packaged with at least one dry erase marker or pen 38 (see FIG. 1) so that children can draw or write on the practice pages repeatedly and then simply erase the markings and start again with a clean page. Alternatively, a different type of erasable surface such as a wet erase surface may be utilized with the invention. Pen 38 may be secured to the front surface of cover page 12 by a small Velcro® tab, and the child's name is preferably written on pen 38 as another visual indicator of such name as well as for decorative purposes. Alternative arrangements for holding pen 38 to workbook 10 when such pen is not in use may also be provided. In addition, while preferably the entire surface of the inner practice pages 14 is coated with an erasable surface, if desired only certain designated practice areas of pages 14a-14i may be provided with the erasable laminate, and somewhat less preferably educational book tool 10 could be manufactured without the inner pages having an erasable surface.

The front surface of inner page 14a includes a work area generally indicated by reference numeral 40 on which a child can practice repeatedly writing the letter to be learned. Work area 40 has printed thereon solid black letter "G" 42, which graphically illustrates to a child what a properly formed capital letter "G" looks like, with pronunciation key 43 positioned above such letter 42. A dark grey letter "G" is positioned adjacent letter 42 and can be traced using pen 38. Also provided in work area 40 are gray shaded traceable letters 44 which are identical to solid black letter 42 except preferably provided in a lighter shade or color and also including arrows 46 that instruct the child as to the usual or proper sequence of strokes of pen 38 that are required to properly form such letter, as well as ruled lines 47. Thus, a child can repeatedly practice tracing over letters 44 following stroke arrows 46 until he or she can accomplish such task neatly, preferably forming clean lines with little effort. During the practice period, the child will have developed the required hand/eye coordination to make such proper strokes. Extending across the center of work area 40 is grid or ruled area 48 comprised of parallel grid lines and several spaces N. In gridded area 48 a child can repeatedly practice forming the letter for such practice page ("G" in FIG. 2 and "a" in FIG. 3), using the grid as a guide. As shown, gridded area 48 includes from left to right a grey shaded letter 44 having stroke arrows 46, three lighter shaded letters 52 that can be traced by the child and serve as a further learning guide, and two blank spaces 53 where the child can practice writing the letters with one the grid lines as a guide. Also provided in work area 40 are images or pictures 54 of physical objects or the like, which in FIG. 2 depict a bunch of grapes and in FIG. 3 depict an apple and an anchor. Such images or pictures 54 are meant to be representative of objects, goods or other articles including or starting with the letter to be practiced and learned on such page. In addition, images or pictures 56, which may be the same or different from images or pictures 54, are provided on the back surface of cover page 12 and practice pages 14a-h and also show items that are spelled starting with the letter to be learned on the paired open facing practice page, the names of which items pictured can be visualized and practiced speaking and pronouncing by the child, which helps the child learn the proper sound of the letter when spoken.

It should be evident in viewing FIGS. 2 and 3 that each of the inner practice pages 14a-14i forming part of educational workbook tool 10 contain a similar practice area 40 that has been customized to teach a child to learn to pronounce and write one of the letters his or her name. In FIG. 3, similarly the front surface of practice page 14b is shown lying flat beside the rear surface of practice page 14a, with sold letter "a" 42, the letter to be learned, and pronunciation key 43 above letter 42, and sample letters 44 with practice arrows 46 positioned in work area 40. After the child has learned to correctly pronounce and write the capital letter "G" on page 14a, the child can then turn to page 14b and practice writing and pronouncing the next letter "a", and then the letter "b" on page 14c, and so on until the child has practiced and learned to write with satisfactory penmanship each letter of his or her name. Of course, the child can practice over a number of sessions writing the letters in any desired order, and can repeat sessions with previously learned letters as a refresher, since in the preferred embodiment practice pages 14a-i have an erasable surface. Using educational workbook tool 10, a child learning to write and spell his or her name for the first time will be able to concentrate on learning to write each letter individually at their own pace, rather than attempting to learn to write all of the different letters at the same time, or even viewing all of the letters together on the same page. By breaking the name into individual letters which are learned on separate pages, the perceived difficulty of the task is minimized. Otherwise, the perceived difficulty of learning to write one's name properly could be greatly increased, which could lead to increased frustration and less motivation, and as a result such child might practice writing for shorter periods or even stop practicing altogether. For a very young child, practicing and learning one letter a week or over a period of days is unlikely to be perceived as being so difficult that the child's interest and motivation wanes, and in fact many children are likely to wish to proceed faster. Each letter may be practiced repeatedly using dry erase pen 38, with the previous practice session being erased.

Figure 4:
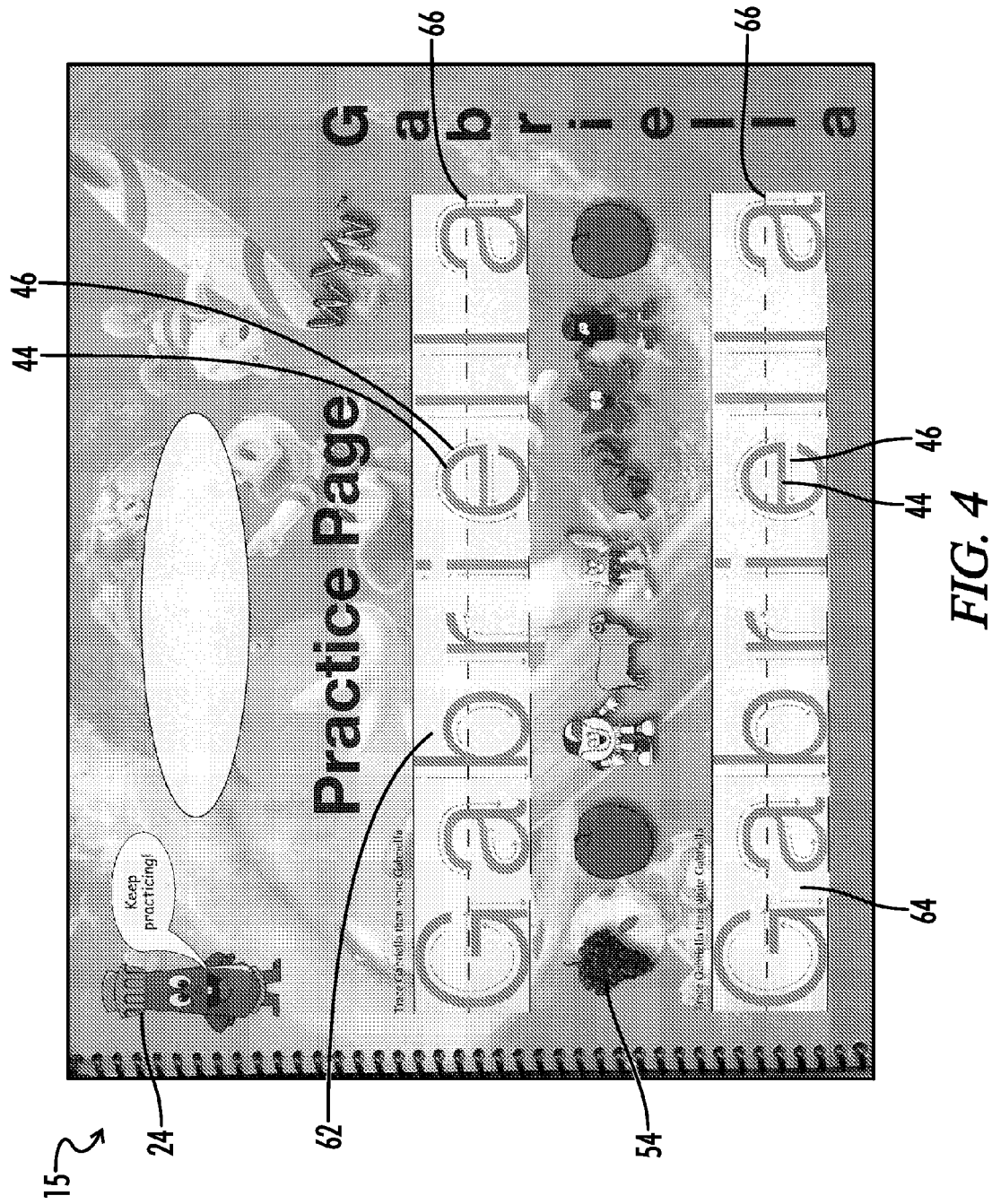
FIG. 4 is a representation of a final practice page of the learning aid shown in FIGS. 1-3.

Referring now to FIG. 4, once a child has practiced and learned to write each letter of his or her name neatly and with proper pen strokes and penmanship, such child can turn to practice page 15, where he or she can practice writing all of the letters of their name in order by tracing. More particularly, practice page 15 includes two practice areas 62 and 64, each having ruled lines 66 and with letters 44 having directional arrows 46 similar to those appearing on pages 14*a*-14*i* as discussed above. Other decorative material 68 may also be provided on practice page 15 and images or items 54 are lined up above/below the corresponding letters in practice areas 62 and 64, respectively. Thus, on practice page 15 the child can practice writing the letters of name 22 until he or she can trace letters 44 using proper strokes 46 with relative ease. It may quite easy for some children to trace their full name after completing each of ordered practice pages 14*a*-14*i*, while for others it may take more practice. In either case, practice page 15 also preferably has an erasable surface, and thus erasable pen 38 may be used repeatedly by the child to practice all of the required pen strokes as desired.

Once a child has practiced writing their full name by tracing letters 44 and following arrows 46 several times on practice page 15, he or she is now ready to write their full name without tracing or other assistance for the first time on memento device 16, shown in FIG. 5. More particularly, memento device 16 includes a gridded or ruled area 72 in which name 22 is to be written, with separate spaces 74 for each letter, and in addition pictures or images 54 depicting items having names starting with the associated letter to be learned may also be provided below spaces 74. In one arrangement, practice page 15 is preferably provided on the inside back cover of workbook 10, while memento device 16 is positioned as the open facing page adjacent practice page 15, so in such arrangement the child can visually refer to letter 44 and arrows 46 in practice areas 62 and 64 as a guide. An important feature of memento device 16 is that name writing area 72 preferably is not provided with an erasable surface as in the other pages of workbook 10, so that letters written in area 72 cannot be erased but rather serve as a permanent record of the child writing his or her full name for the first time without tracing or other assistance. A permanent writing pen may be provided with workbook 10 for making such writing, although this should not be given to the child until after satisfactorily completing ordered practice page 14*a-i* and practice page 15. A congratulatory message 76 or other written material may also be provided on memento device 16 to make it into a more attractive remembrance type item.

Once the child has completed writing his or her full name in writing area 72, memento device 16 can be removed from the booklet along perforations 82 adjacent ring binder 20 if provided as well as across the page below handle cutout 25. Device 16 may then as shown in FIG. 6 be fitted into a frame 84 or the like to serve as a permanent keepsake item 86. The present inventor's educational tool device differs from other childhood memento and memorialization devices in that in such other known arrangements wherein a plaque or the like is awarded to a child after a certain accomplishment or achievement, or a photograph of an event is framed, in the present inventor's memorialization system, the actual occurrence of the child writing his or her full name properly for the first time is being physically recorded and memorialized. The memorialization page is not utilized until after a child has completed the ordered practice pages for each letter of the child's name, and in addition until after the child has spent time practicing writing such name on practice page 15. The memento page 16 may also include a space 86 for attachment of a photograph of the child taken on the day of the full writing out of their name as a permanent adjunct to the main memento. In addition, the workbook 10 can also be saved as a separate remembrance item and kept with a family's picture albums or other remembrance items.

Figure 7:
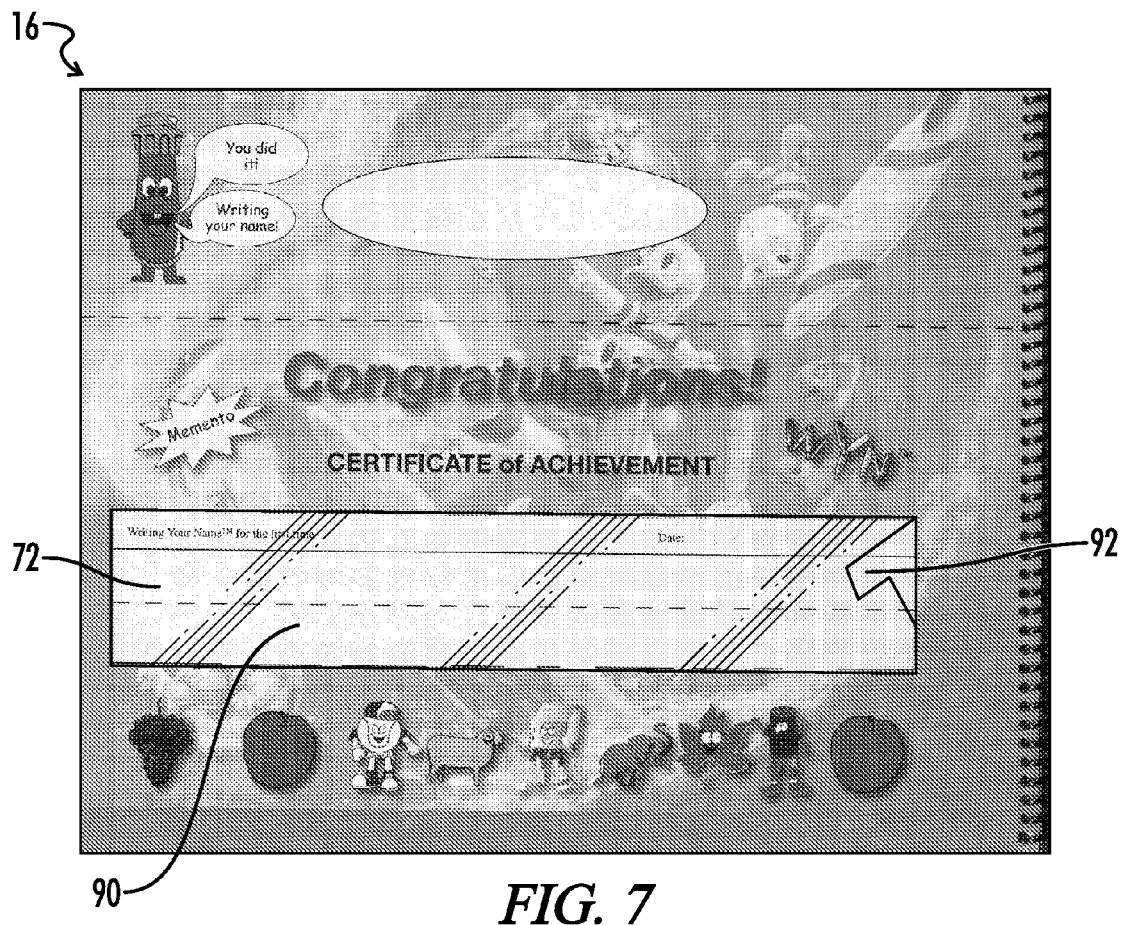
FIG. 7 illustrates an alternative embodiment of a memorializing page of the keepsake device of the present invention.
Figure 8:
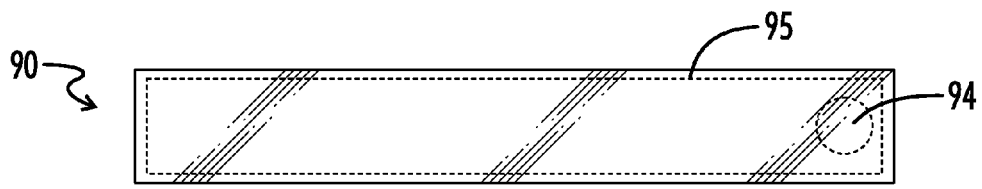
FIG. 8 illustrates an alternative protective covering for use with the memorializing page shown in FIG. 7.

The keepsake memorialization sheet or plate need not be of the same material as the other practice pages for the writing system of the invention, but may be of a heavier and more durable material, such as a heavier card stock or even a thin plastic material, although if it is placed ultimately within a picture frame or a large modern photo album with protective adhering face sheets for protection of photographic reproductions, it will easily last a lifetime in good preserved form. FIG. 7 illustrates another preferred embodiment of remembrance or memorialization item 16, in which name writing area 72 is provided with a removable transparent plastic covering 90 to protect such area from being marked or otherwise disturbed prior to the child writing his or her full name in such area. The plastic covering may include a short pull tab 92 on one end to facilite gripping and then removing the covering, and covering 90 may have a small amount of light adhesive applied around its periphery to secure it to item 16 in a manner so that when the covering is removing, the adhesive does not damage or tear the remembrance item. Other means known to those skilled in the art for securing and then removing covering 90 without damaging the surface of remembrance item 16 may be provided. The remainder of the outer surface of item 16 except for name writing area 72 may be provided with an erasable coating as is preferred in the other pages of workbook 10. FIG. 8 illustrates a slightly alternative embodiment of covering 90 in which rather than having tab 92, a small perforated area 94 is provided on one end of covering 90 which can be easily removed by inserting one's finger under the cover through area 94 and lifting upwardly until the adhesive 95 along the edges of covering 90 is released from remembrance item 16. Once removed, covering 90 may be discarded, and the child can write his or her full name in area 72 for the first time using a permanent marking pen as discussed above.

Since it is intended that a separate book for each popular given name be produced, making it necessary to provide either a preproduced supply of the name writing books of the invention or else have a facility for producing the name books to order such as being supplied for the fulfillment of Internet orders or the like, it will often be convenient to provide display racks for use in displaying the name writing books of the invention and for selection of the proper books. Part of the enjoyment of parents and grandparents in selecting one of the name writing books for their children or other relatives or friends children is looking for and finding the correct book for the particular name of the child. Such rack or display rack will therefore usually have slots or shelves preferably for display of the name writing books of the invention in alphabetical order and with sufficient shelf space for holding more of the books for more popular names than for less popular names. Such racks may be longitudinal to fit in with the usual racks in bookstores or drugstores, which establishments may be one of the more frequent sales locations the name writing practice items of the invention or may be more spherical or oval in configuration for more open locations.

The present inventor's educational book or workbook tool can be further customized for any name, languages, or combination of words as desired. It is also contemplated that other tools and devices for aiding a child in learning to write each letter may also be incorporated in the present educational too. In one possible arrangement, a representation of each letter on inner pages 14 may be raised on the surface of the page so the child can feel the shape of the letter in addition to seeing and tracing the shape. A groove may also be provided in the raised letter in which the tip of a stylus or the like may be inserted, so that the child can practice forming the letter by moving the stylus in the groove, which will teach the child the feeling of moving the writing device in the manner and direction required to write the letter properly. A further improvement that can be incorporated into the present invention is to add a voice activation means whereby a speaker means for the child to listen to his or name, or the individual letters of such name, or the names of the pictured items on the pages is provided.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A learning device for facilitating a child practicing writing the letters of their name and then writing their name for the first time, and for memorializing such event comprising:
   (a) a plurality of learning and practice sheets secured together along one edge by a binding means, each of said sheets containing information relating to a letter in the name of a child, said sheets being arranged serially in order according to the child's name, the information arranged in facing sheets with at least one of said facing sheets being provided with a graphic representation of a finished letter, each of said sheets additionally containing at least one work area for practicing the manual strokes required to form the letter with a writing tool by tracing of said letter and then practicing writing the letter without tracing;
   (b) at least one final practice sheet connected to said plurality of learning and practice sheets for the child to practice writing their name, said final practice sheet containing at least one practice area having a graphic representation of the child's name which can be traced by the child; and
   (c) a keepsake sheet connected to the plurality of learning and practice sheets and final practice sheet having a writing area for the child to write his or her name without assistance for the first time, said writing area including a ruled section in a single row sized according to the length of the child's name, the keepsake sheet being detachable from the plurality of learning and practice sheets and final practice sheets and adapted for memorializing the event of said child writing his or her name for the first time.

2. A learning device in accordance with claim 1 additionally comprising a self-erasing surface provided in at least said work area of the plurality of learning and practice sheets and said practice area of the at least one final practice sheet.

3. A learning device in accordance with claim 2 in which at least the writing area of the keepsake sheet has a surface adapted for permanent fixation of said written name.

4. A learning device in accordance with claim 3 additionally comprising a transparent covering detachably secured over at least the writing area of the keepsake sheet.

5. A learning device in accordance with claim 3 additionally comprising images of physical objects on said plurality of learning and practice sheets in which the names of said physical objects when pronounced start with or form the same sound the letter to be practiced on said sheets.

6. A learning device in accordance with claim 5 in which one or more of the images of physical objects are repeated on the final practice sheet and keepsake sheet and are positioned in close proximity to the same letters of said name on said plurality of learning and practice sheets.

7. A learning device in accordance with claim 5 in which the proper form of the letter to be practiced on each of said plurality of learning and practice sheets is illustrated, and in addition said illustration including representational lines indicating the direction and order of the strokes to make to form the letter by freehand reproduction with a writing tool.

8. A learning device in accordance with claim 7 in which the practice area of said at least one final practice sheet additionally comprises drafting lines illustrating the line writing direction and sequence for each letter in the graphic representation of the child's name.

9. A learning device in accordance with claim 2 in which the plurality of learning and practice sheets and final practice sheet are provided with a dry erase surface, and additionally comprising at least one dry erase pen.

10. A learning device in accordance with claim 9 in which the keepsake sheet additionally comprises an area for recording the date the child wrote his or her name on said keepsake sheet.

11. A learning device in accordance with claim 1 that is customizable for use with any name in any language.

12. A system for gradually teaching a child to write and spell his or her name and for recording the first occurrence of said child writing his or her name, comprising a workbook containing a plurality of serially ordered individual practice sheets according to the letters of the child's name, each of said individual practice sheets having an area on which a child can practice forming at least one of the letters of his or her name with different levels of assistance, a final practice sheet having at least one area for a child to practice writing his or her name by tracing, and a removable remembrance sheet having an area sized for the child after having completed the serially ordered individual practice sheets and final practice sheet to write his or her name in permanent ink a single time and for the first time, which remembrance sheet memorializes such event and is adapted to be removed from the workbook and converted into a framable keepsake item.

13. The system of claim 12 additionally comprising a protective covering secured over the area of the remembrance sheet where the child will write his or her name in permanent ink, which covering protects such area from being marked or damaged during letter writing practice sessions, and which covering is removed shortly before the child is ready to write his or her name on the remembrance sheet.

14. The system of claim 12 in which the serially ordered practice sheets and final practice sheets have an erasable surface allowing for repeated use of the sheets as many times as needed by a child.

15. The system of claim 14 in which the ordered practice sheets additionally comprise a graphic representation of a finished letter, a pronunciation key, at least one ruled area to practice for tracing and then writing the letter using a writing utensil, said ruled area containing a plurality of spaces, at least one of said plurality of spaces containing a graphic representation of the letter including arrows illustrating the proper direction strokes required to form the letter, at least one of said plurality of spaces containing a lighter graphic representation of the letter including said proper stroke direction arrows, at least two of said plurality of spaces containing a lighter graphic representation of the letter adapted for tracing said letter without containing said proper stroke direction arrows, and at least one of said plurality of spaces including the rightmost space being blank, and at least one graphic image of a physical object representative of a word related to the letter being learned and practiced on said sheet.

16. A method for creating a keepsake item of the occurrence of a child writing his or her name for the first time comprising a workbook having a plurality of serially ordered practice sheets according to the letters of the child's name each having an area on which a child can practice forming one of the letters of his or her name, a final practice sheet having at least one area for a child to practice writing his or her complete name by tracing, and a removable remembrance sheet having an area particularly sized to receive the name of the child, said method being comprised of the steps of:
- (a) the child practicing writing each of the individual letters of his or her name using the ordered practice sheets;
- (b) the child practicing writing the letters of his or her complete name using the final practice sheet;
- (c) the child writing his or her complete name in permanent ink on the remembrance sheet;
- (d) removing the remembrance sheet from the workbook;
- (e) retaining said remembrance sheet as a keepsake item suitable for framing.

17. The method of claim 16 additionally comprising the step of:
- (e) prior to writing on the remembrance sheet removing a protective covering applied to the writing area of said remembrance sheet.

18. A learning device in accordance with claim 1 additionally comprising a plurality of spaces in said writing area with a number equal to the number of letters in the name of the child.

19. A learning device in accordance with claim 18 in which the width of each of the plurality of spaces varies according to the letter to be received in said space.

* * * * *